United States Patent
Shang et al.

(10) Patent No.: US 8,948,782 B2
(45) Date of Patent: Feb. 3, 2015

(54) PROXIMITY DETERMINATION BASED ON DISTANCE RATIOS

(71) Applicant: QUALCOMM Incorporated, San Diego, CA (US)

(72) Inventors: Ning Shang, San Diego, CA (US); Yafei Yang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 227 days.

(21) Appl. No.: 13/724,350

(22) Filed: Dec. 21, 2012

(65) Prior Publication Data

US 2014/0179338 A1    Jun. 26, 2014

(51) Int. Cl.
*H04W 24/00*    (2009.01)
*H04W 4/02*    (2009.01)
*H04W 4/00*    (2009.01)

(52) U.S. Cl.
CPC .............. *H04W 4/023* (2013.01); *H04W 4/008* (2013.01); *H04W 4/021* (2013.01)
USPC ................... 455/456.1; 455/456.2; 455/456.3

(58) Field of Classification Search
USPC .......... 455/456.1, 456.2, 414.1, 456.3, 456.6, 455/566, 126, 550.1, 13.4, 522; 180/169; 307/104; 342/115, 118, 189, 387, 465; 348/192; 355/53, 78; 356/4.01, 5.01; 367/93; 381/56, 107, 102, 98; 382/100; 705/14.34, 14.58, 14.53, 14.36; 725/81, 117, 107
See application file for complete search history.

(56) References Cited

U.S. PATENT DOCUMENTS

| | | | |
|---|---|---|---|
| 6,792,128 B1 * | 9/2004 | Nguyen | ........................ 382/100 |
| 7,680,501 B2 | 3/2010 | Sillasto et al. | |
| 7,974,642 B2 | 7/2011 | Lin et al. | |
| 2005/0130634 A1 | 6/2005 | Godfrey | |
| 2009/0280835 A1 * | 11/2009 | Males et al. | ................ 455/456.5 |
| 2010/0246485 A1 * | 9/2010 | Potkonjak | ..................... 370/328 |
| 2011/0171973 A1 | 7/2011 | Beck et al. | |
| 2012/0116861 A1 | 5/2012 | Dobyns | |

* cited by examiner

*Primary Examiner* — Charles Appiah
*Assistant Examiner* — Alexander Yi
(74) *Attorney, Agent, or Firm* — Hunter Clark PLLC

(57) ABSTRACT

Systems and methods of determining proximity of a mobile device to a target location are described herein. A method as described herein includes identifying a signal sent by the mobile device and received by respective ones of a set of receivers including at least a first receiver and a second receiver, wherein the first receiver and second receiver are positioned collinearly to the target location; determining a first signal-quality metric observed at the first receiver and a second signal-quality metric observed at the second receiver with respect to the signal; computing a ratio associated with distances from the mobile device to the first receiver and the second receiver, respectively, based on the first signal-quality metric and the second signal-quality metric; and determining whether the mobile device is within a proximity region defined in relation to the target location based on the ratio.

40 Claims, 11 Drawing Sheets

PROXIMITY DETERMINATION BASED ON DISTANCE RATIOS

BACKGROUND

Advancements in wireless communication technology have greatly increased the versatility of today's wireless communication devices. These advancements have enabled wireless communication devices to evolve from simple mobile telephones and pagers into sophisticated computing devices capable of a wide variety of functionality such as multimedia recording and playback, event scheduling, word processing, e-commerce, etc. As a result, users of today's wireless communication devices are able to perform a wide range of tasks from a single, portable device that conventionally required either multiple devices or larger, non-portable equipment.

Many applications in the realm of mobile computing can leverage information relating to the proximity of computing devices to one another. For example, a mobile computing device may be configured to search for and attempt to pair with other nearby mobile devices. Other applications, such as geo-fencing, data security, and the like, also utilize proximity determinations. Further, as mobile computing devices are becoming increasingly configured to operate in an Internet of Things environment in which objects are identified and tracked relative to each other, proximity determination is expected to become increasingly important in the future. Thus, low-cost techniques for determining proximity between devices are desirable.

SUMMARY

An example of a method for determining proximity of a mobile device to a target location as described herein includes identifying a signal sent by the mobile device and received by respective ones of a set of receivers including at least a first receiver and a second receiver, where the first receiver and second receiver are positioned collinearly to the target location; determining a first signal-quality metric observed at the first receiver and a second signal-quality metric observed at the second receiver with respect to the signal; computing a ratio associated with distances from the mobile device to the first receiver and the second receiver, respectively, based on the first signal-quality metric and the second signal-quality metric; and determining whether the mobile device is within a proximity region defined in relation to the target location based on the ratio.

Implementations of the above method may include one or more of the following features. The first signal-quality metric and the second signal-quality metric each respectively includes at least one of packet loss rate or received signal strength indications (RSSI). Computing the ratio as a difference of the first signal-quality metric and the second signal-quality metric. The proximity region is a circular region centered on the target location. The proximity region comprises a set of points, where for each point of the set of points, a ratio of a first distance between the point and the first receiver and a second distance between the point and the second receiver is equal to a ratio constant. Determining that the mobile device is within the proximity region if the computed ratio is less than or equal to the ratio constant. Defining the target location and a radius of the proximity region, and positioning the first receiver and the second receiver such that the set of points forms the proximity region. Defining positions of the first receiver and the second receiver and at least one of the ratio constant or a radius of the proximity region, and determining a position of the target location based on the positions of the first receiver and the second receiver and the ratio constant or the radius of the proximity region. Defining the target location and a size of the proximity region, and positioning the first receiver and the second receiver in relation to the target location based on the size of the proximity region. Defining positions of the first receiver and the second receiver and a size of the proximity region, and determining a position of the target location based on the positions of the first receiver and the second receiver and the size of the proximity region.

Implementations of the above method may additionally or alternatively include one or more of the following features. Identifying a source of secured data stored on a network, and conditioning access to the secured data by the mobile device on the mobile device being identified within the proximity region. Communicatively coupling the mobile device to at least a second communication device upon determining that the mobile device is within the proximity region. Communicating an alert if the mobile device is determined to be outside the proximity region. Estimating a first distance from the mobile device to the first receiver based on the first signal-quality metric, estimating a second distance from the mobile device to the second receiver based on the second signal-quality metric, and computing the ratio as a distance ratio of the first distance and the second distance.

An example of an apparatus for determining proximity of a mobile device to a target location as described herein includes a set of receivers including at least a first receiver and a second receiver, where the first receiver and second receiver are positioned collinearly to the target location and a proximity region defined in relation to the target location, and where each of the set of receivers are configured to receive a signal from the mobile device. The apparatus also includes a signal analysis module communicatively coupled to the set of receivers and configured to determine a first signal-quality metric observed at the first receiver and a second signal-quality metric observed at the second receiver with respect to the signal. Further, the apparatus includes a proximity detection module communicatively coupled to the signal analysis module and configured to compute a ratio associated with distances from the mobile device to the first receiver and the second receiver, respectively, based on the first signal-quality metric and the second signal-quality metric and to determine whether the mobile device is within the proximity region based on the ratio.

Implementations of the above apparatus may include one or more of the following features. The first signal-quality metric and the second signal-quality metric each respectively includes an RSSI, and the proximity detection module is further configured to compute the ratio as a difference of the first signal-quality metric and the second signal-quality metric. The proximity region is a circular region centered on the target location and comprises a set of points such that, for each point of the set of points, a ratio of a first distance between the point and the first receiver and a second distance between the point and the second receiver is equal to a ratio constant. The proximity detection module is configured to determine whether the mobile device is within the proximity region by comparing the ratio of the first signal-quality metric and the second signal-quality metric to the ratio constant. A proximity region definition module configured to define the target location and a radius of the proximity region, and a receiver positioning module communicatively coupled to the proximity region definition module and configured to position the first receiver and the second receiver such that the set of points forms the proximity region. A receiver positioning module configured to define positions of the first receiver and the second receiver, and a proximity region definition module communicatively coupled to the receiver positioning module and configured to define at least one of the ratio constant or a radius of the proximity region and to determine a position of the target location based on the positions of the first receiver and the second receiver and the ratio constant or the radius of the proximity region. A proximity region definition module configured to define the target location and a size of the proximity region, and a receiver positioning module communicatively coupled to the proximity region definition module and configured to position the first receiver and the second receiver in relation to the target location based on the size of the proximity region. A receiver positioning module configured to define positions of the first receiver and the second receiver, and a proximity region definition module communicatively coupled to the receiver positioning module and configured to define a size of the proximity region and to determine a position of the target location based on the positions of the first receiver and the second receiver and the size of the proximity region.

Implementations of the above apparatus may additionally or alternatively include one or more of the following features. The first receiver and the second receiver are receive antennas coupled to a multi-antenna communication device. A secured network location associated with at least one of data or network devices, and a security management module communicatively coupled to the secured network location and the proximity detection module and configured to condition access to the secured network location by the mobile device on the mobile device being identified within the proximity region by the proximity detection module. An alarm module communicatively coupled to the proximity detection module and configured to communicate an alert if the mobile device is determined to be outside the proximity region by the proximity detection module.

Another example of an apparatus for determining proximity of a mobile device to a target location as described herein includes means for identifying a signal sent by the mobile device and received by respective ones of a set of receivers including at least a first receiver and a second receiver, where the first receiver and second receiver are positioned collinearly to the target location; means for determining a first signal-quality metric observed at the first receiver and a second signal-quality metric observed at the second receiver with respect to the signal; means for computing a ratio associated with distances from the mobile device to the first receiver and the second receiver, respectively, based on the first signal-quality metric and the second signal-quality metric; and means for determining whether the mobile device is within a proximity region defined with respect to the target location based on the ratio.

Implementations of the above apparatus may include one or more of the following features. The first signal-quality metric and the second signal-quality metric each respectively includes an RSSI, and the means for computing the ratio comprises means for computing the ratio as a difference of the first signal-quality metric and the second signal-quality metric. The proximity region is a circular region centered on the target location and comprises a set of points such that, for each point of the set of points, a ratio of a first distance between the point and the first receiver and a second distance between the point and the second receiver is equal to a ratio constant. Means for determining that the mobile device is within the proximity region if the computed ratio is less than or equal to the ratio constant. Means for defining the target location and a size of the proximity region, and means for positioning the first receiver and the second receiver in relation to the target location based on the size of the proximity region. Means for defining positions of the first receiver and the second receiver and a size of the proximity region, and means for determining a position of the target location based on the positions of the first receiver and the second receiver and the size of the proximity region. The first receiver and the second receiver are receive antennas coupled to a multi-antenna communication device. Means for identifying a source of secured data stored on a network, and means for conditioning access to the secured data by the mobile device on the mobile device being identified within the proximity region. Means for communicatively coupling the mobile device to at least a second communication device upon determining that the mobile device is within the proximity region. Means for communicating an alert if the mobile device is determined to be outside the proximity region.

An example of a computer program product as described herein resides on a processor-executable computer storage medium and includes processor-executable instructions. The instructions are configured to cause a processor to identify a signal sent by a mobile device and received by respective ones of a set of receivers including at least a first receiver and a second receiver, where the first receiver and second receiver are positioned collinearly to a target location; determine a first signal-quality metric observed at the first receiver and a second signal-quality metric observed at the second receiver with respect to the signal; compute a ratio associated with distances from the mobile device to the first receiver and the second receiver, respectively, based on the first signal-quality metric and the second signal-quality metric; and determine whether the mobile device is within a proximity region defined with respect to the target location based on the ratio.

Implementations of the computer program product may include one or more of the following features. The proximity region is a circular region centered on the target location and comprises a set of points such that, for each point of the set of points, a ratio of a first distance between the point and the first receiver and a second distance between the point and the second receiver is equal to a ratio constant. Instructions configured to cause the processor to determine that the mobile device is within the proximity region if the computed ratio is less than or equal to the ratio constant. Instructions configured to cause the processor to define the target location and a size of the proximity region and to position the first receiver and the second receiver in relation to the target location based on the size of the proximity region. Instructions configured to cause the processor to define positions of the first receiver and the second receiver and a size of the proximity region and to determine a position of the target location based on the positions of the first receiver and the second receiver and the size of the proximity region.

Items and/or techniques described herein may provide one or more of the following capabilities, as well as other capabilities not mentioned. Proximity of a mobile communication device to a given point can be determined without the use of satellite positioning receivers or other costly sensors and with reduced computational complexity. The techniques for determining proximity described herein are applicable to a wide range of use cases with little to no modification. Calculations performed in proximity determination may be independent of the strengths of measured signals, thereby increasing the robustness of the determination. The techniques described herein are independent of absolute locations or distances as well as the strength of the independent measured signals, and facilitate proximity determination with lower cost and improved robustness as compared to previous solutions. In addition, techniques described herein may help with device pairing since the techniques described herein do not rely upon user involvement or specialized hardware. Further, techniques described herein facilitate increased versatility and can be applied in a variety of uses such as wireless healthcare, livestock monitoring, and so on. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

Described herein are systems and methods for determining proximity, such as proximity of a device to a target location or region, based on a ratio of measured relative distances. While proximity determination has a variety of uses for applications such as mobile device pairing, geo-fencing, network security, etc., conventional systems have encountered difficulty in accurately determining proximity in a low-cost manner. Most existing solutions for proximity determination rely on absolute distances based on coordinates, such as those obtained through a satellite positioning system (SPS) such as the Global Positioning System (GPS), Galileo, etc., and/or through wireless communication based on signal strength indications or other metrics. In contrast to these approaches, techniques are provided for determining proximity based on measured relative distances, e.g., based on one or more ratios of measured relative distances.

Figure 1:
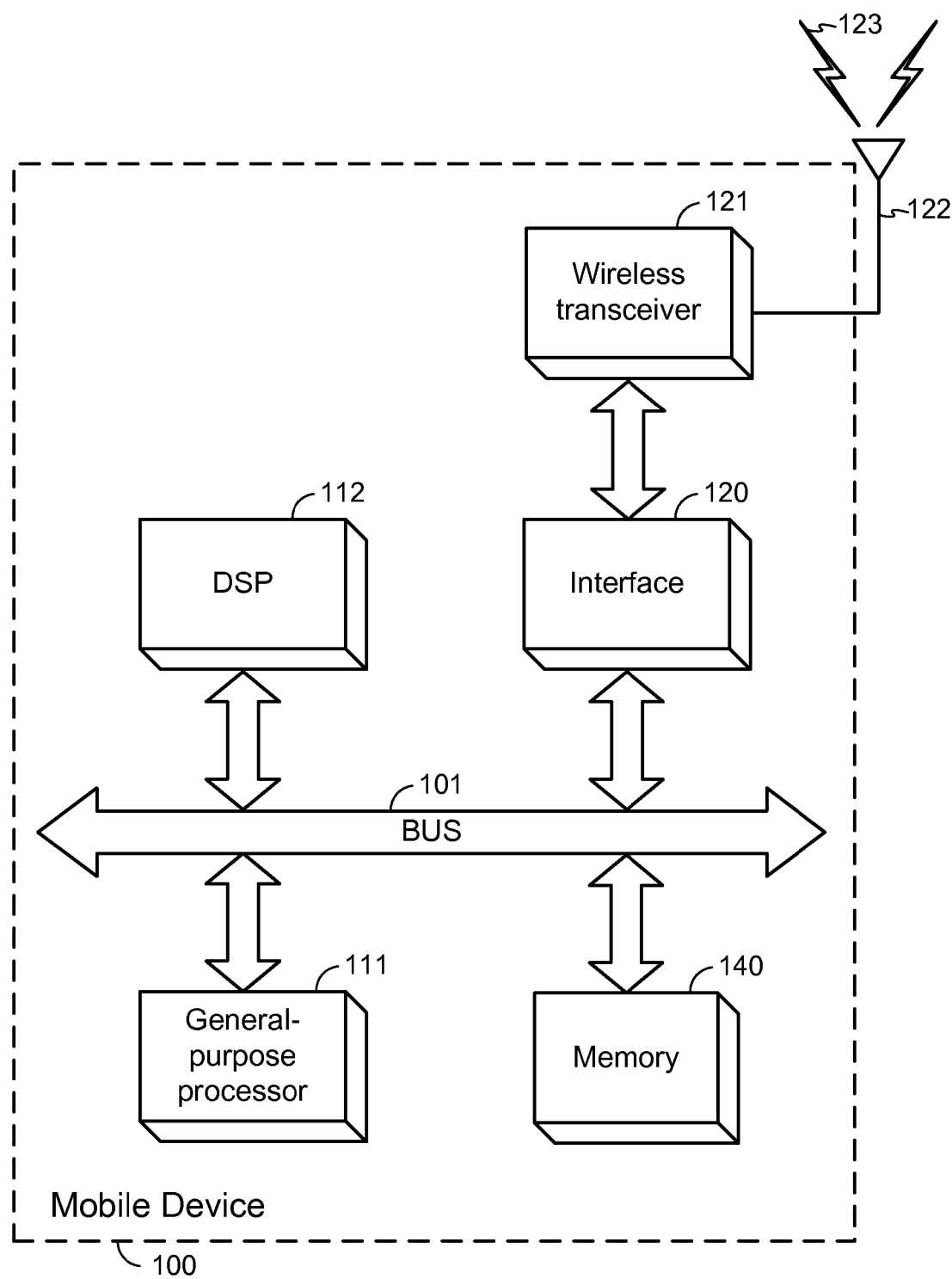
FIG. 1 is a block diagram of components of a mobile computing device.

Systems and methods described herein operate via one or more mobile devices. These mobile devices include, but are not limited to, personal digital assistants (PDAs), smartphones, computing devices such as laptops, desktops or tablet computers, automobile computing systems, etc., whether presently existing or developed in the future. Referring to FIG. 1, an example mobile device 100 includes a wireless transceiver 121 that sends and receives wireless signals 123 via a wireless antenna 122 over a wireless network. The transceiver 121 is connected to a bus 101 by a wireless transceiver bus interface 120. While shown as distinct components in FIG. 1, the wireless transceiver bus interface 120 may also be a part of the wireless transceiver 121. Here, the mobile device 100 is illustrated as having a single wireless transceiver 121. However, a mobile device 100 can alternatively have multiple wireless transceivers 121 and wireless antennas 122 to support multiple communication standards such as WiFi, Code Division Multiple Access (CDMA), Wideband CDMA (WCDMA), Long Term Evolution (LTE), Bluetooth, etc.

A general-purpose processor 111, memory 140, digital signal processor (DSP) 112 and/or specialized processor(s) (not shown) may also be utilized to process the wireless signals 123 in whole or in part. Storage of information from the wireless signals 123 is performed using a memory 140 or registers (not shown). While only one general purpose processor 111, DSP 112 and memory 140 are shown in FIG. 1, more than one of any of these components could be used by the mobile device 100. The general purpose processor 111, DSP 112 and memory 140 are connected to the bus 101.

The memory 140 includes a non-transitory computer-readable storage medium (or media) that stores functions as one or more instructions or code. Media that can make up the memory 140 include, but are not limited to, RAM, ROM, FLASH, disc drives, etc. Functions stored by the memory 140 are executed by the general-purpose processor 111, specialized processor(s), or DSP 112. Thus, the memory 140 is a processor-readable memory and/or a computer-readable memory that stores software (e.g., programming code, instructions, etc.) configured to cause the processor 111 and/or DSP 112 to perform the functions described. Alternatively, one or more functions of the mobile device 100 may be performed in whole or in part in hardware.

Figure 2:
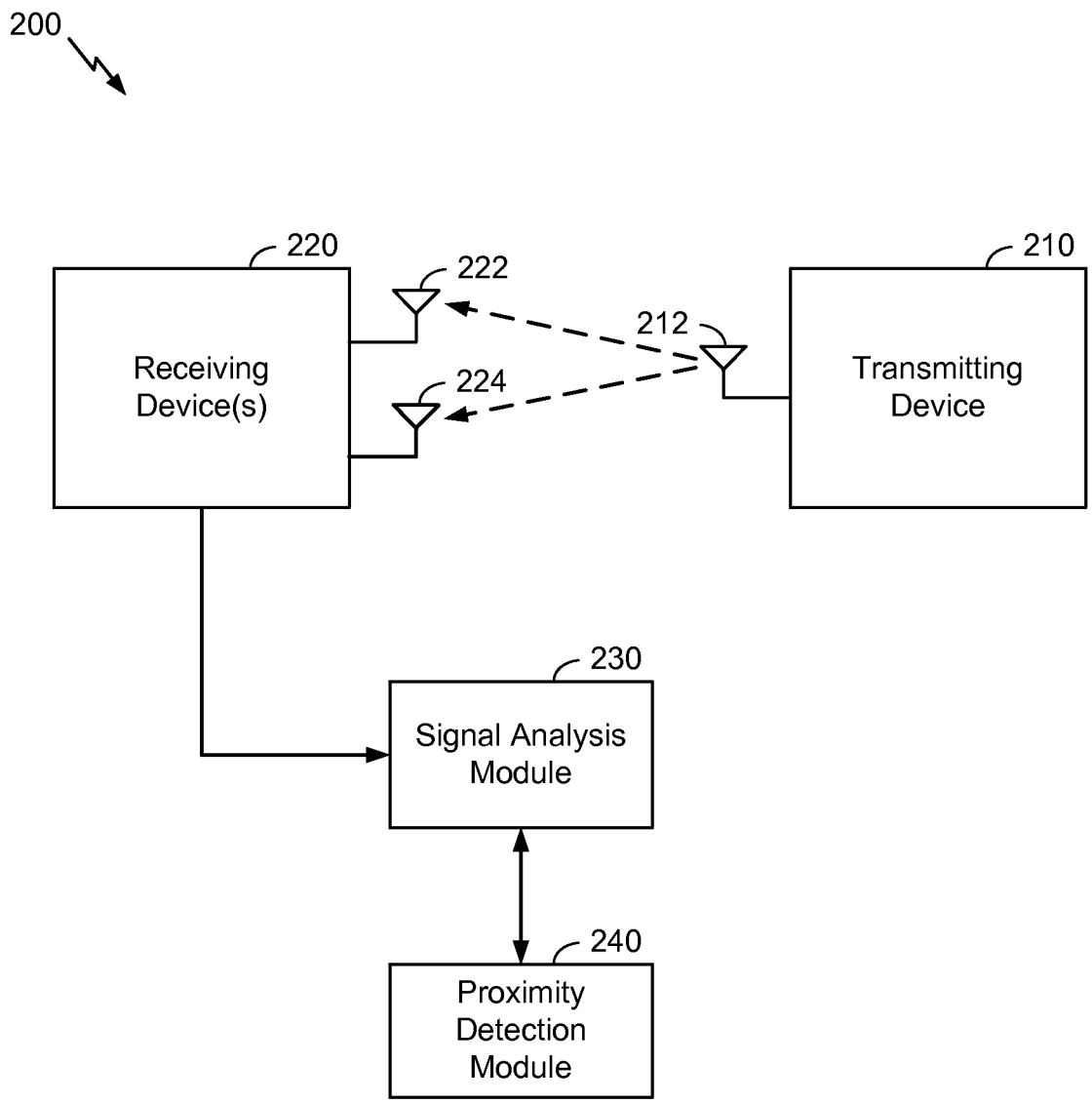
FIG. 2 is a block diagram of a system for determining proximity of a transmitting device to a target point.

Referring next to FIG. 2, a system 200 for determining proximity of a transmitting device 210 to a target point includes one or more receiving devices 220 that are in communication with the transmitting device 210. A target location and/or region (also referred to herein as a "proximity region") are defined relative to receive (Rx) antennas 222, 224 of the receiving device(s) 220. A transmitting device 212 transmits a signal to the Rx antennas 222, 224 of the receiving device(s) 220 via a transmit (Tx) antenna 212. One or more measurements are performed at a signal analysis module 230 relative to the signal as received at each of the Rx antennas 222, 224. These measurements may include measurements of signal-quality metrics (e.g., signal strength, packet loss) and/or any other suitable properties. A ratio of these measurements is computed by a proximity detection module 240. Based on the computed ratio, the proximity detection module 240 determines whether the transmitting device 210 is proximate to the target location or region. Proximity may be defined according to various criteria, being within a specified proximity region and/or outside a specified exclusion region, being no more than a threshold distance from a target location or point, etc. Techniques for defining proximity and regions associated therewith are described in further detail below.

By using ratios of measured relative distances, the system 200 is operable to determine whether a transmitting device 210 lies within a region of interest without the use of satellite positioning (e.g., GPS, Galileo, Glonass, Beidou, etc.) receivers, radar transceivers, or other costly specialized positioning mechanisms. Further, by using the ratios of the measured relative distances, the determination by the proximity detection module 240 is independent of the signal strength and/or power of the Tx antenna 212.

The Rx antennas 222, 224 may be associated with a single, multi-antenna device or multiple devices each having one or more antennas. While the Rx antennas 222, 224 are described in the context of receiving signals within the system 200, the Rx antennas 222, 224 could also be configured to transmit data to one or more associated devices. Further, while only two Rx antennas 222, 224 are shown, any number of Rx antennas 222, 224 could be used provided that there are two or more Rx antennas 222, 224. Further, the receiving device(s) 220 could include other antennas that are not utilized as Rx antennas 222, 224 for the purposes described herein. The manner in which a target location and/or region is defined relative to the positions of the Rx antennas 222, 224 is described in further detail below. The Rx antennas 222, 224 may be positioned in any suitable manner, and any manner of spacing between the Rx antennas 222, 224 may be used. For instance, the Rx antennas 222, 224 may be a set of antennas associated with a cellular telephone or other single, portable wireless communication device, or alternatively the Rx antennas 222, 224 may be associated with different devices, base stations or access points, or other network entities, which may be positioned any distance from each other suitable to define a proximity region. The Rx antennas 222, 224 need not be in communication with each other or capable of communication with each other (e.g., due to distance or other factors), provided that each of the Rx antennas 222, 224 is (directly or indirectly) communicatively coupled to the signal analysis module 230.

Similarly, while the transmitting device 210 is illustrated in system 200 as including only a single Tx antenna 212, the transmitting device 210 may include any number of antennas. Further, the Tx antenna 212 may in some cases be used to transmit information to devices other than the receiving device(s) 220 and/or to receive information. The transmitting device 210, the receiving device(s) 220, and their respective antennas 212, 222, 224 may be fixed or mobile. For instance, the transmitting device 210 and receiving device(s) 220 may be associated with moving vehicles, e.g., to track the proximity of a vehicle associated with the transmitting device 210 relative to a region defined with respect to vehicle(s) associated with the receiving device(s) 220.

Figure 3:
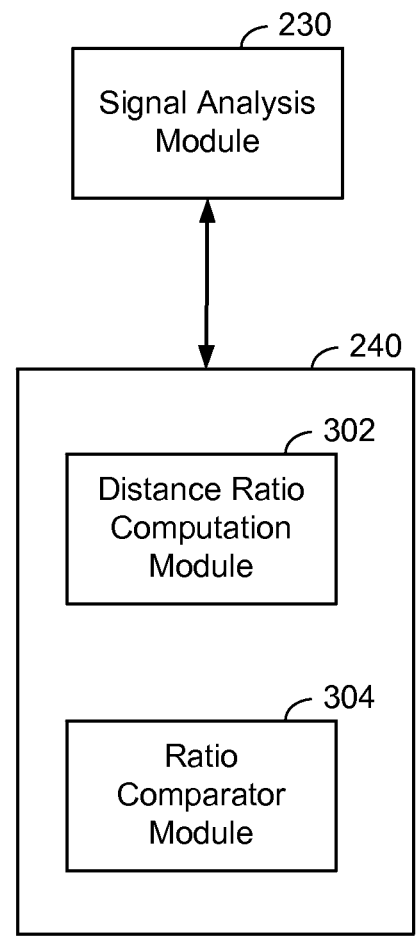
FIG. 3 is a block diagram illustrating various functions of the proximity detection module shown in FIG. 2.

The measurements performed by the signal analysis module 230 and the operations performed by the proximity detection module 240 are illustrated by FIG. 3. As discussed above, the signal analysis module 230 obtains and analyzes signals received from Rx antennas 222, 224 associated with one or more receiving devices 220. The signal analysis module performs one or more measurements indicative of the relative distances of the Tx antenna 212 to the respective Rx antennas 222, 224. For instance, an example of relative distance that can be used by the signal analysis module 230 is the received signal strength indication (RSSI). As known in the art, the distance between a sender and receiver can be inferred from the RSSI when conditions such as the signal power and the medium are constant. However, since the power of the signal sender and the medium in which signals are transmitted may vary, it is generally difficult to accurately derive the absolute distance between the sender and receiver in a given unit using only RSSI. In contrast, the ratio of distances from a signal sender to multiple receivers can be accurately determined independently of absolute distance as the ratio of the RSSIs at the receivers. Thus, the proximity detection module 240 utilizes a distance ratio computation module 302 and a ratio comparator module 304 to determine the proximity of a transmitting wireless device 210 based only on the ratio of the distances between the transmitting device 210 and two or more Rx antennas 222, 224.

The ratio may be computed and used directly, e.g., by estimating the distance from the Tx antenna 212 to each of the Rx antennas 222, 224 and finding the ratio, or indirectly, e.g., based on raw measurements that could be used to determine the distances. For example, RSSIs or other signal strength measurements associated with the Tx antenna 212 as observed at the Rx antennas 222, 224 could be used for computation of the ratio without first computing the distances corresponding to these measurements. Further, in some cases, indirect computation of a distance ratio associated with the Tx antenna 212 and Rx antennas 222, 224 can be performed based on raw measurements based on operations other than direct division. For instance, if RSSI measurements are obtained at the Rx antennas 222, 224 from a Tx antenna 212, the ratio of the distances from the Tx antenna 212 to the respective Rx antennas 222, 224 can be computed indirectly by calculating a difference of the RSSIs observed at the Rx antennas 222, 224, because RSSI values are logarithmic with respect to distance. Other computations could also be performed.

In the description that follows, RSSI is used as an illustrative, non-limiting example of a signal measurement that can be performed by the signal analysis module 230 and used by the proximity detection module 240. Other measures of relative distances can be used other than RSSI, such as packet loss ratio and/or any other measurements suitable to convey information relating to the relative distance between a transmitter and a receiver. Because the ratio of these measurements is used, the techniques described herein apply independently of the particular measurement used.

Figure 4:
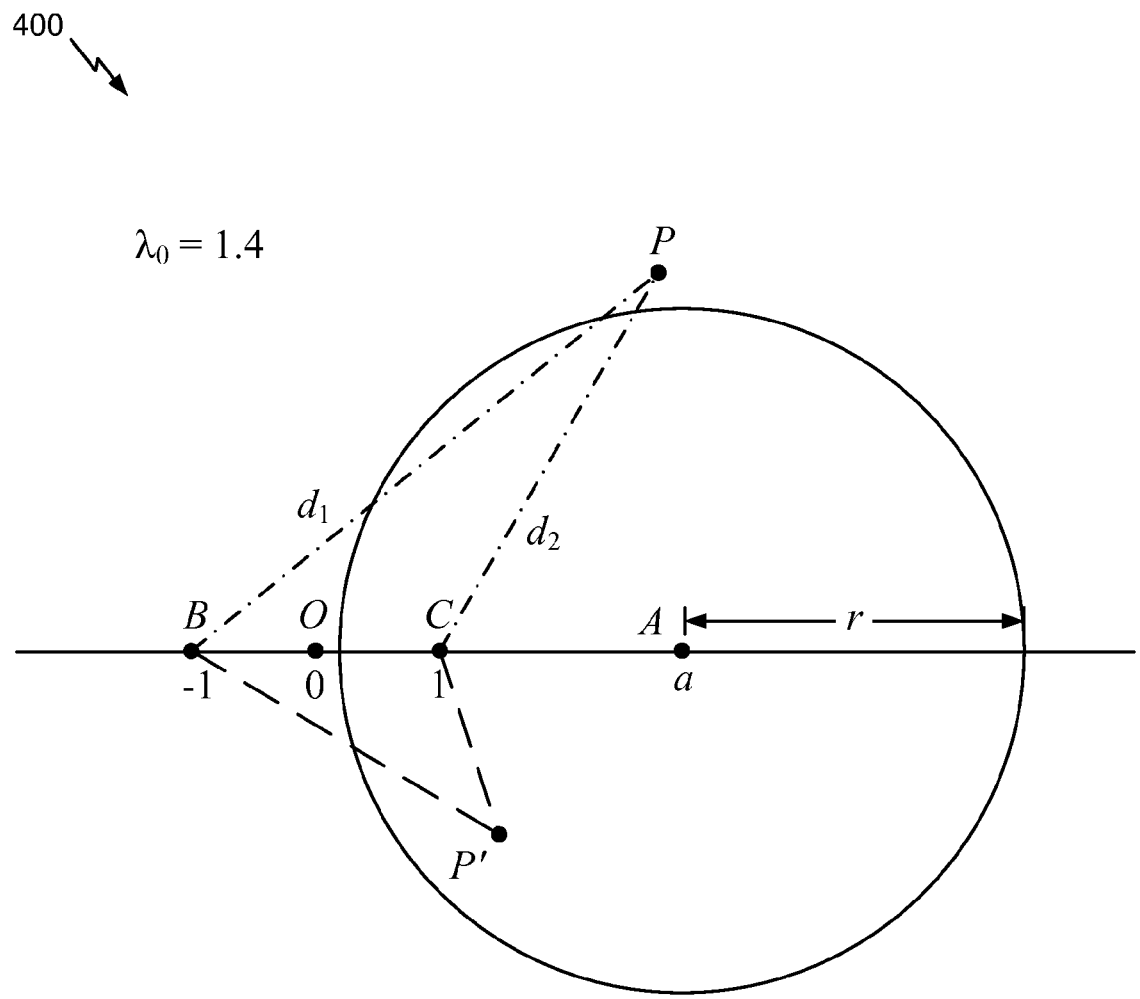
FIG. 4 is an illustrative view of a proximity determination as performed by the systems of FIGS. 2 and 3.

Operation of the signal analysis module 230 and the proximity detection module 240 is illustrated by diagram 400 in FIG. 4. The techniques shown in diagram 400 and described herein can be applied to any unit of distance. Here, a determination is to be made regarding whether the distance to a target point A in 3-dimensional space is less than a value r or not. Thus, a proximity region is defined as a circle of radius r centered on point A. As discussed below, other techniques for defining a proximity region can be used. Based on the defined region, proximity detection proceeds as follows:

1) Set up a Cartesian coordinate system such that the coordinates of A is (a, 0, 0), where $a=\sqrt{r^2+1}$.

2) Position two Rx antennas 222, 224 at points B=(−1, 0, 0) and C=(1, 0, 0). Define a function $\lambda(P)=d_1/d_2$ to denote the ratio of the distances $d_1$ and $d_2$ from a point P corresponding to a Tx antenna 212 of a transmitting device 210 to points B and C, respectively. The ratio $\lambda$ can be obtained from the two Rx antennas 222, 224 using the measured relative distances (e.g., RSSIs) from P.

3) Define $\lambda_0=\sqrt{(a+1)/(a-1)}$ as a threshold value. According to these definitions, the following hold:

a) The distance from P to A, d(P, A), is less than r if and only if $\lambda(P)>\lambda_0$.

b) The distance d(P, A) is greater than r if and only if $\lambda(P)<\lambda_0$.

c) The distance d(P, A) is equal to r if and only if $\lambda(P)=\lambda_0$.

Statements (a)-(c) can be derived as follows. First, the coordinates of P are defined as (x, y, z). If d(P, A)=r, the following hold:

$$(x-a)^2 + y^2 + z^2 = r^2, \text{ i.e., } (x-a)^2 + y^2 + z^2 = a^2 - 1.$$

$$\lambda(P)^2 = d_1^2/d_2^2$$
$$= \frac{((x+1)^2 + y^2 + z^2)}{((x-1)^2 + y^2 + z^2)}$$
$$= \frac{((x+1)^2 + a^2 - 1 - (x-a)^2)}{((x-1)^2 + a^2 - 1 - (x-a)^2)}.$$

By cancelling out terms from the numerator and denominator of the above expression, the following is derived:

$$\lambda(P)^2 = (a+1)(a-1) = \lambda_0^2,$$

and by extension, $\lambda(P) = \lambda_0$, thereby showing that expression (c) above holds. Further, because the function $f(s) = (s+1)/(s-1)$ decreases as s increases (for s>1), expressions (a) and (b) above also hold.

The above describes proximity detection in a 3-dimensional space. Similar techniques to those described above could be used to extend the calculations to N-dimensional spaces. In particular, diagram 400 illustrates an application of the above to a two-dimensional plane. With respect to diagram 400, a point A is determined and a circular proximity region centered at A and with a radius r is identified. Subsequently, two receiver points B and C are chosen that are collinear along a line extending from the center point A of the proximity region. The two receiver points B, C are positioned and spaced such that for each point on the circle, a ratio of the distances from each of the receiver points B, C to an arbitrary point X, i.e., BX/CX, is a constant, $\lambda$. With respect to points A, B, C, a 3-dimensional coordinate system is defined such that A is located at (a, 0, 0), B is located at (−1, 0, 0) and C is located at (1, 0, 0). The x-coordinate a is defined relative to the radius r such that $a = \sqrt{r^2 + 1}$. Based on this definition, the constant $\lambda$ can also be defined relative to a, such that $\lambda = \sqrt{(a+1)(a-1)}$.

Figure 5:
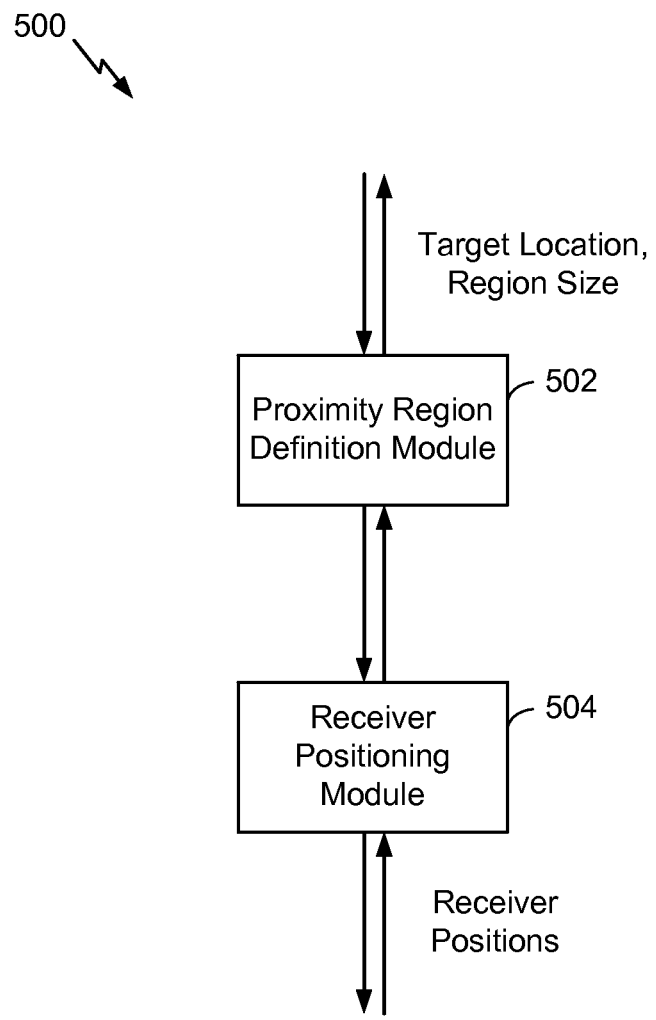
FIG. 5 is a block diagram of a system for defining a proximity region for a proximity determination.

Based on the above, the circular proximity region as shown in diagram 400 can be constructed given either (1) the location of A and the desired radius r; or (2) the locations of points B, C and the desired ratio constant $\lambda$ and/or radius r. A system 500 for defining a proximity region as shown in diagram 400 is illustrated by FIG. 5. As noted above, proximity of a transmitting device is determined based on the ratio of distances between an antenna of the transmitting device and two or more receive antennas. For an example with two receive antennas, a proximity region is defined as the area containing all points such that the distance ratio $d_1/d_2$ is no greater than the $\lambda_0$, threshold, based on the definitions of $d_1$, $d_2$ and $\lambda_0$ given with respect to diagram 400. While this definition results in a circular proximity region of radius r centered on a target point A as shown in diagram 400, other definitions are also possible. For instance, more than two receive antennas could be employed to define multiple circular regions with respect to respective pairs of the receive antennas. The proximity region could then be defined as a union and/or intersection of these regions. Similarly, multiple ratio thresholds may be used to define circular regions of varying sizes with respect to either a common pair of receive antennas or different pairs of receive antennas chosen from among a set of three or more receive antennas. One or more regions could also be identified as exclusion regions or exclusion zones, such that a proximity determination is negative for a transmitting device located in an exclusion region.

In general, a proximity region is defined with respect to one or more regions (e.g., circular regions) having specified sizes (e.g., radius, area, etc.), center points, corresponding receiver points, ratio thresholds, or other parameters. System 500 illustrates a mechanism for setting a proximity region including a proximity region definition module 502 and a receiver positioning module 504. The proximity region definition module 502 receives as input one or more receiver positions (e.g., positions of Rx antennas 222, 224) and computes one or more properties of an associated proximity region, such as a target location or center point, a region size or radius, etc. Conversely, the receiver positioning module 504 receives as input one or more properties of a proximity region and computes appropriate positions for positioning receivers such that the proximity region is realized. As shown in system 500, definition of a proximity region may be performed as a bidirectional process. Referring again to the two cases in the above paragraph with further reference to diagram 400, in the case of (1), the x-coordinate a of point A is determined based on the radius r, from which points B, C are positioned collinearly by the receiver positioning module 504 as described above. For (2), a 3-dimensional coordinate system is defined such that points B, C are located at (−1, 0, 0) and (1, 0, 0), respectively, as described above. Point A is then positioned by the proximity region definition module 502 at (a, 0, 0) as described above based on the ratio constant $\lambda$ or radius r. If necessary, the radius r is also calculated at this stage based on a.

In general, definition of a proximity region can be performed by the proximity region definition module 502 given a set of receiver positions, or alternatively one or more desired properties of the proximity region can be determined in advance, based on which the receiver positioning module 504 provides corresponding receiver positions. In this manner, a proximity region can be flexibly defined based on a particular implementation. For instance, the proximity region definition module 502 may be utilized for implementations in which the receiver positions are fixed or otherwise known, and the receiver positioning module 504 may be utilized for implementations in which the receiver positions are flexible but the proximity region is to be constrained to a particular area.

Figure 6:
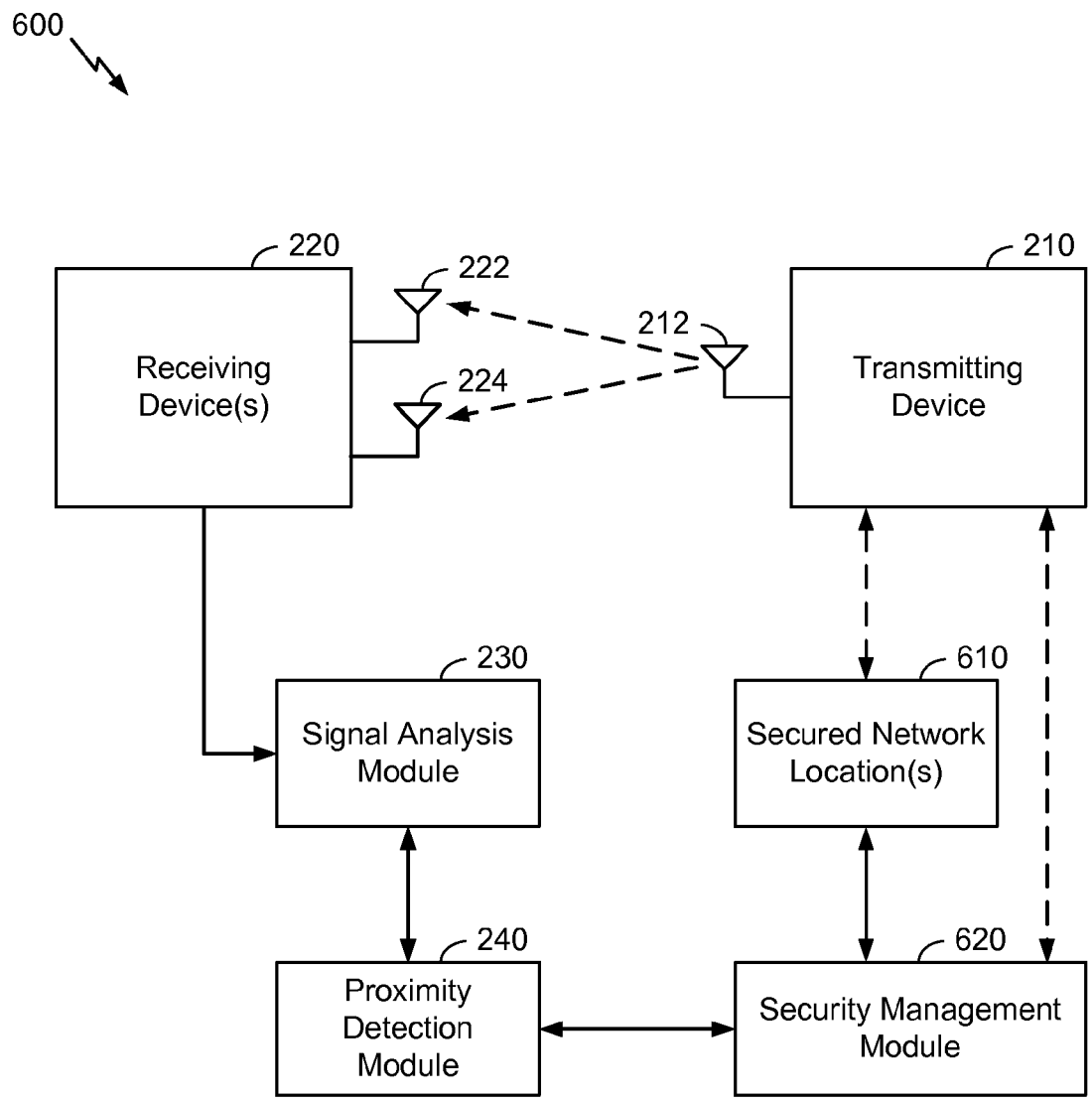
FIG. 6 is a block diagram of a system for utilizing proximity determination in connection with securing access to network resources.

The proximity detection techniques described herein can be applied to a variety of implementations. For instance, system 600 in FIG. 6 shows the proximity detection system of FIG. 2 applied in a network security system. The system 600 manages access to one or more secured network locations 610, such as network devices, data stored on a network, and/or other network entities. A security management module 620 communicates with the proximity detection module 240 and the transmitting device 210 to selectively allow or deny the transmitting device 210 access to secured network locations 610.

System 600 can be used for pairing of wireless devices as follows. Wireless communication between devices can expose private data. Thus, for security reasons it is desirable to be able to recognize specific devices and enable trust relationships between these devices. By using the security management module 620 combined with the proximity detection module 240 to pair devices, various advantages over previous implementations are realized. First, system 600 does not require additional peripherals or sensors, such as Universal Serial Bus (USB) or Near Field Communication (NFC) devices, cameras, keyboards, etc., other than the antennas that exist in all wireless communication devices. Second, system 600 executes pairing automatically, which is useful when multiple devices are to be paired. As long as a device is placed within a defined authentication region, the proximity detection module 240 and security management module 620 trigger the pairing procedure automatically.

Within the area of device pairing and security, the system 600 can be used for pairing of a laptop and a wireless telephone (e.g., for tethering, data sharing or other purposes) as follows. A laptop equipped with two wireless local area network (WLAN) antennas can utilize the two antennas as Rx antennas 222, 224 for defining an authentication region as shown in FIGS. 4 and 5. When a WLAN-enabled wireless telephone is present in the authentication region, the phone and the laptop can be automatically paired. Conversely, when the telephone is outside the authentication region, the phone and the laptop are not paired.

As another example, system 600 can be applied to a health care (hospital) scenario as follows. In healthcare scenarios, patients may carry personal devices such as smartphones. In order to communicate with hospital information systems and devices, the personal devices are first paired with a hospital wireless system. Using system 600, an authentication region can be set at the area of hospital registration. Subsequently, patients' devices can be automatically paired while the patients enter the authentication region upon registration.

Figure 7:
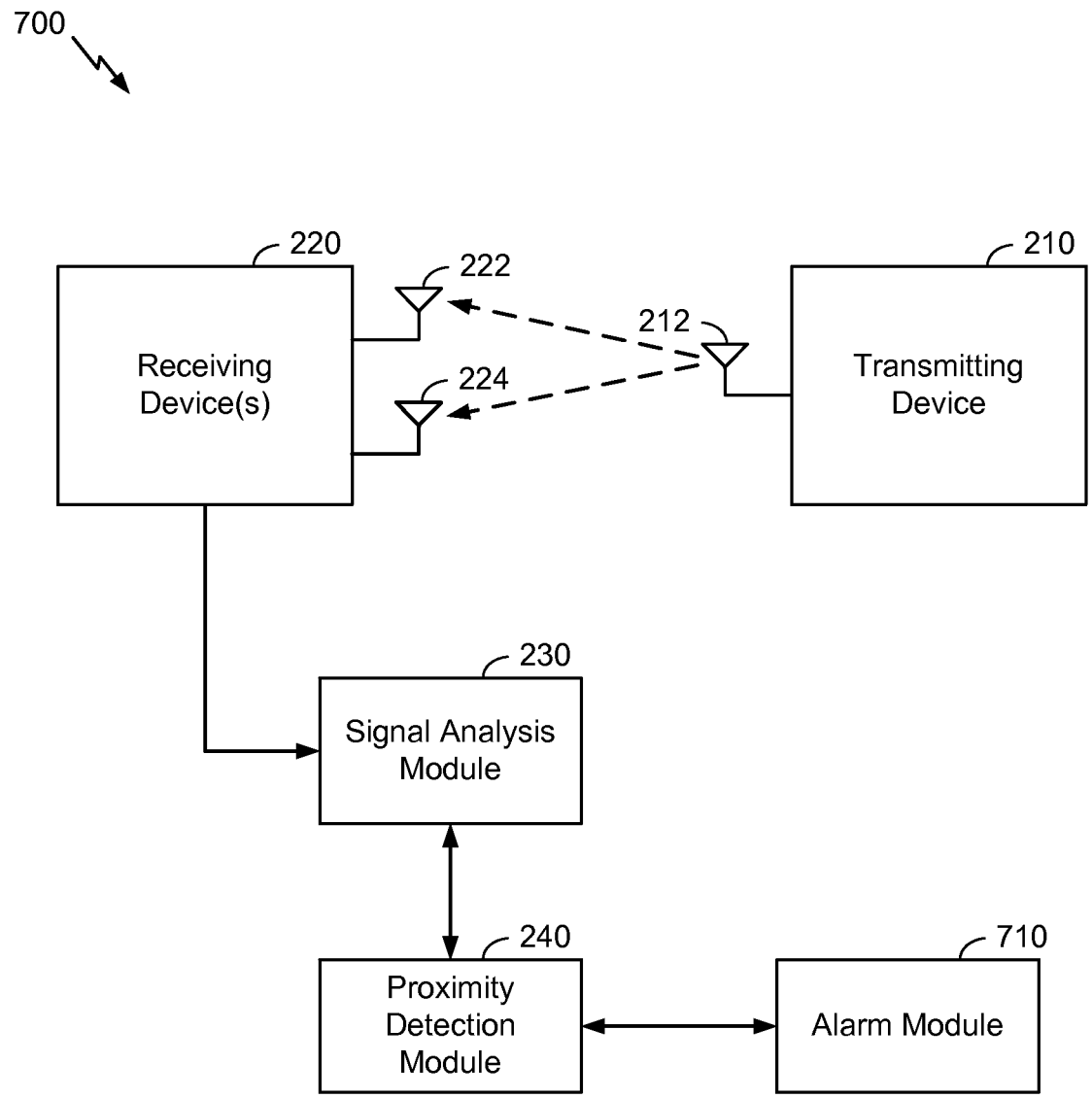
FIG. 7 is a block diagram of a system for utilizing proximity determination in connection with an alarm function.

Another application of the system of FIG. 2 is for use in geo-fencing applications, as shown by system 700 in FIG. 7. System 700 includes an alarm module 710, which interacts with the proximity detection module 240 to convey alerts, alarms, or other notifications regarding the presence or absence of one or more tracked transmitting devices 210 within the proximity region. For instance, system 700 can be used for geo-fencing herds of cattle and/or other livestock. A geo-fencing region is established based on the position of Rx antennas 222, 224. Inexpensive transmitting devices 210 are placed on each cow or other object to be tracked, e.g., via a tracking device affixed to a collar or the like. The Tx antennas 212 of the transmitting devices 210 allow monitoring of the presence or absence of the tracked livestock or objects within the geo-fencing region. A warning message is then sent via the alarm module 710, e.g., to an owner of the tracked items, if a transmitting device 210 is leaving the geo-fencing region. By using the system 700 as shown in FIG. 7, geo-fencing is performed with lower cost compared to other methods such as GPS geo-fencing.

Figure 8:
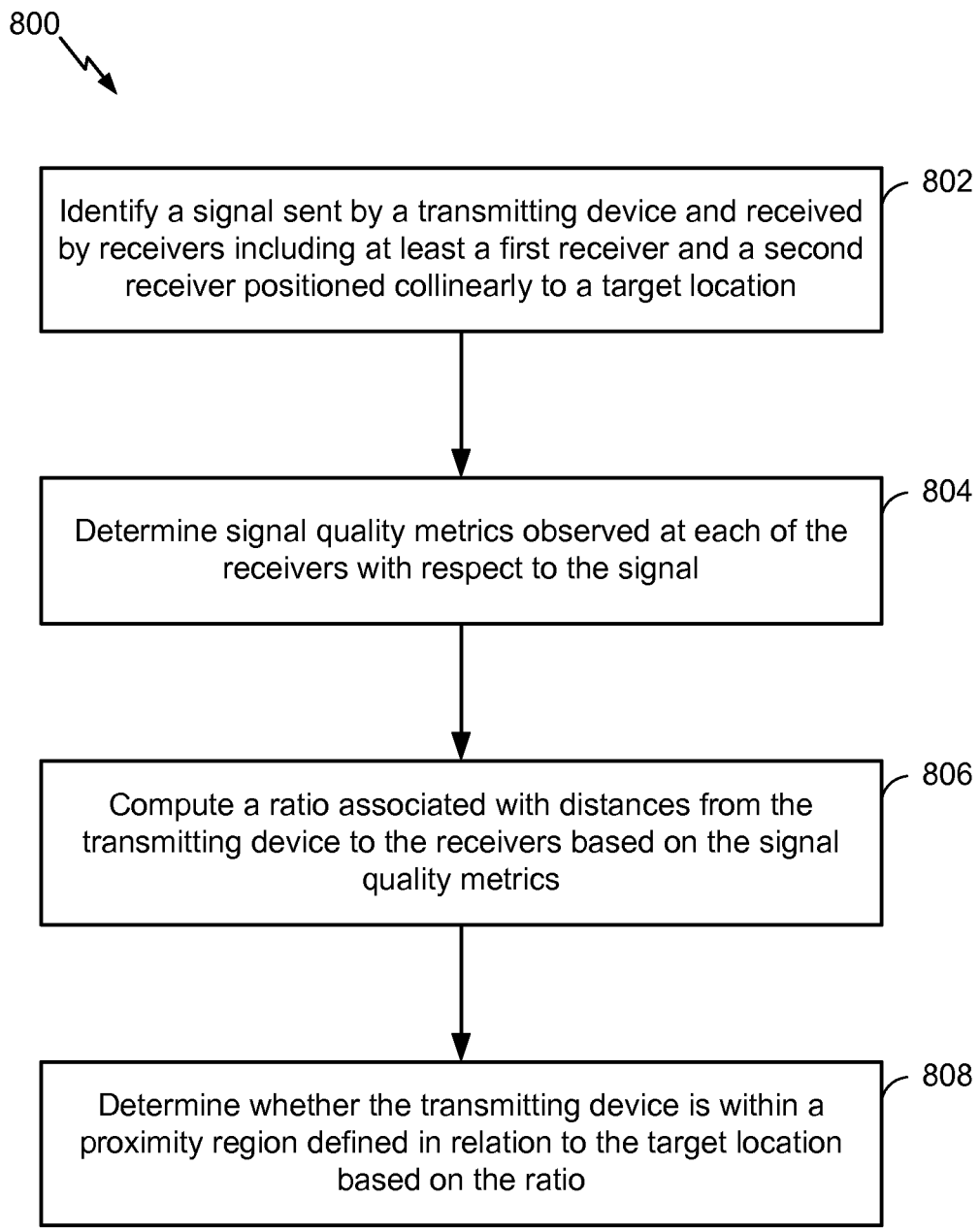
FIG. 8 is a block flow diagram of a process of determining proximity between a transmitting device and a target location.

Referring to FIG. 8, with further reference to FIGS. 1-7, a process 800 of determining proximity between a transmitting device 210 and a target location includes the stages shown. The process 800 is, however, an example only and not limiting. The process 800 can be altered, e.g., by having stages added, removed, rearranged, combined, and/or performed concurrently. Still other alterations to the process 800 as shown and described are possible.

At stage 802, a signal is identified that is sent by a transmitting device 210 (via a Tx antenna 212) and received by receivers including a first receiver and a second receiver (e.g., Rx antennas 222, 224) positioned collinearly to a target location. The signal may be of any type or format suitable for designating the signal as one for proximity detection. For instance, the signal may include one or more identifiers, or identification of the signal as being for proximity detection may be implicit, e.g., based on the format of the signal.

At stage 804, signal-quality metrics (e.g., RSSI, packet loss ratio, etc.) observed at each of the receivers with respect to the signal are determined. Any signal-quality metric or combination of metrics may be used provided that the same metric(s) are used for each receiver. The determination at stage 804 is performed by the signal analysis module 230 and/or other suitable components of a proximity detection system.

At stage 806, a ratio associated with distances from the transmitting device to the first and second receivers, respectively, is computed based on the signal-quality metrics determined at stage 804. The ratio may be computed as a direct ratio of the signal-quality metrics or in any other manner suitable for obtaining a distance ratio, including computing a difference of signal-quality metrics given as signal strength values, etc. This computation may be performed by a signal analysis module 230, a proximity detection module 240, and/or any other suitable components of a proximity detection system.

At stage 808, a determination is made, e.g., by a proximity detection module 240 and/or other suitable mechanisms, regarding whether the transmitting device is within a proximity region defined in relation to the target location based on the ratio obtained at stage 806. As noted above, the proximity region may be circular or substantially circular as defined in relation to two Rx antennas 222, 224, or alternatively the proximity region may be defined in other manners, such as the union or intersection of multiple circular regions based on a set of more than two Rx antennas. The proximity region may also be defined with relation to an exclusion region in which a transmitting device 210 within the exclusion region is determined to not be within the proximity region. Other techniques for defining the proximity region are also possible.

Figure 9:
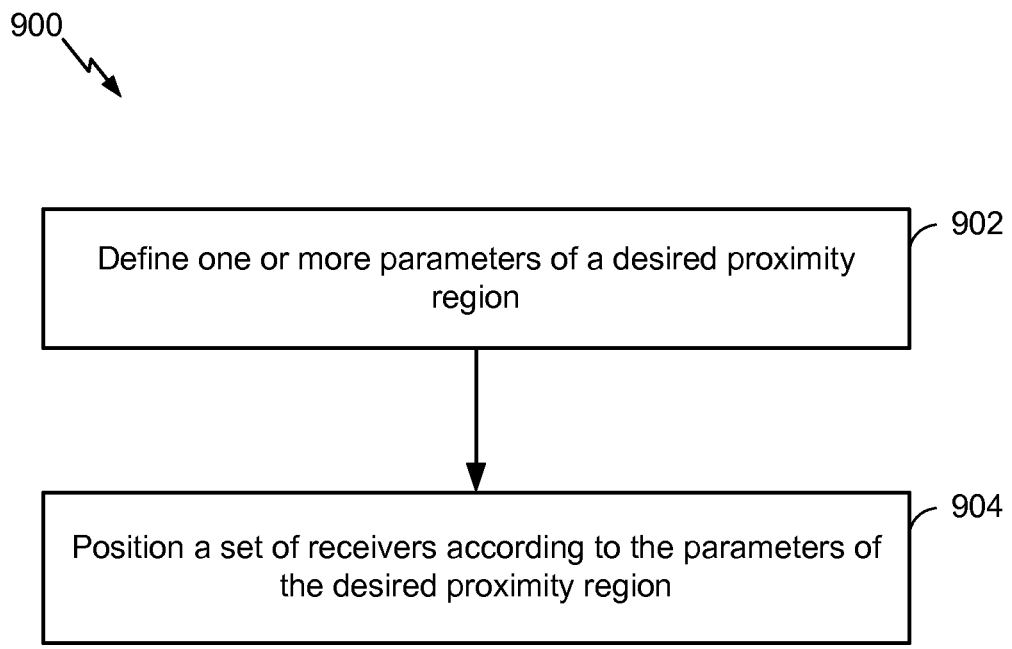
FIGS. 9-10 are block flow diagrams of respective processes of defining a proximity region associated with the proximity determination process shown in FIG. 8.

Referring next to FIG. 9, with further reference to FIGS. 1-7, a process 900 of defining a proximity region, e.g., for use by a proximity detection system 200, includes the stages shown. The process 900 is, however, an example only and not limiting. The process 900 can be altered, e.g., by having stages added, removed, rearranged, combined, and/or performed concurrently. Still other alterations to the process 900 as shown and described are possible.

At stage 902, one or more parameters of a desired proximity region are defined. For instance, in the case of a circular proximity region as shown in diagram 400, these parameters could include the radius r, the center point A and/or the ratio constant $\lambda$. For non-circular regions or regions based on multiple circles, similar parameters could be used.

At stage 904, a set of receivers (e.g., Rx antennas 222, 224) are positioned according to the parameters defined at stage 902. The receivers can be positioned by a receiver positioning module 504 based on a coordinate system at points B and C as shown in diagram 400 relative to the position of a target point A. Other techniques for positioning receivers as described above could also be used.

Figure 10:
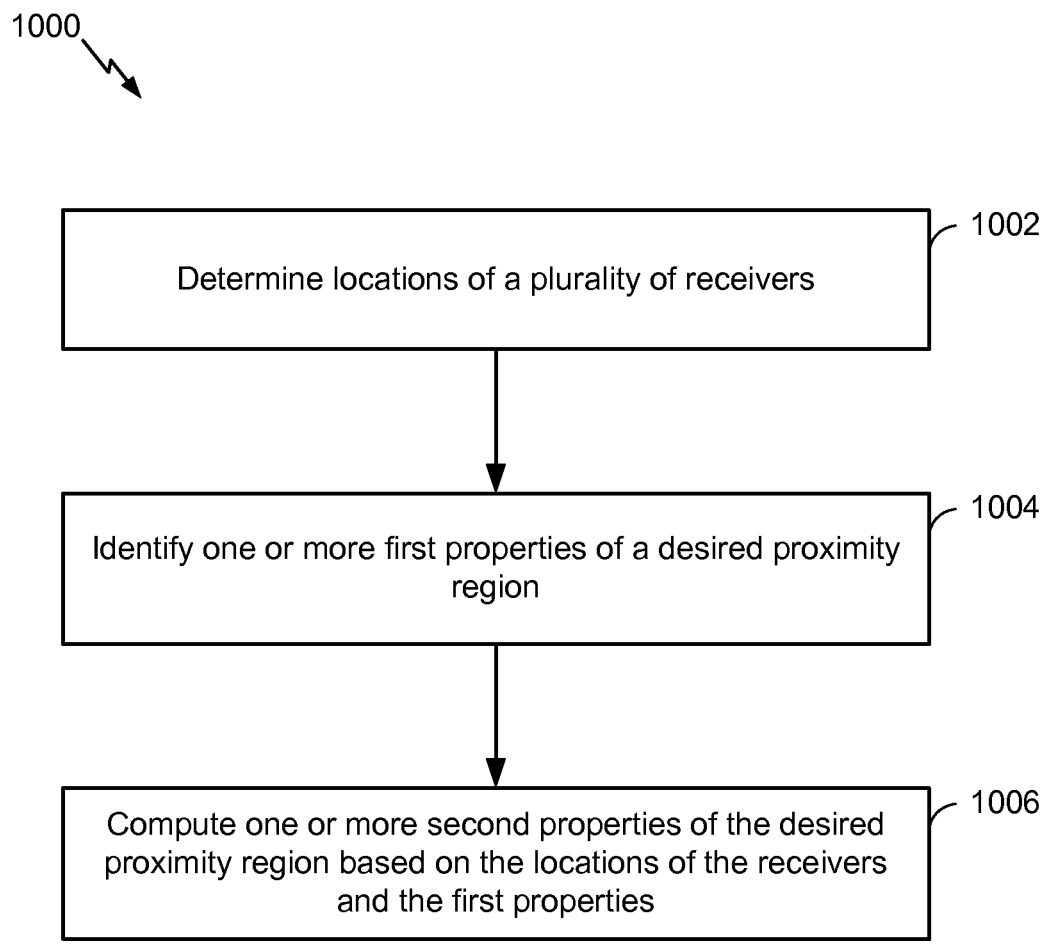

Referring next to FIG. 10, with further reference to FIGS. 1-7, another process 1000 of defining a proximity region, e.g., for use by a proximity detection system 200, includes the stages shown. The process 1000 is, however, an example only and not limiting. The process 1000 can be altered, e.g., by having stages added, removed, rearranged, combined, and/or performed concurrently. Still other alterations to the process 1000 as shown and described are possible.

At stage 1002, locations of a plurality of receivers, such as Rx antennas 222, 224, are identified. As described above relative to diagram 400, a coordinate system can be defined for identified receiver locations such that the receivers are located along a coordinate axis and spaced apart by a unit distance. Other definitions could be used; for instance, multiple coordinate axes could be defined for a system of more than two receivers such that each pair of receivers is defined as positioned along a respectively defined axis.

At stage 1004, one or more first properties of a desired proximity region are identified. These properties could include, e.g., a desired radius or size of the proximity region, a ratio constant, and/or other suitable properties.

At stage 1006, one or more second properties of the desired proximity region are computed based on the receiver locations as identified at stage 1002 and the first properties identified at stage 1004. The second properties can be computed by a proximity region definition module 502 and/or other appropriate mechanisms using one or more of the techniques described above. The second properties could include, e.g., a center point of the proximity region, the radius or size of the proximity region if such information is not included among the first properties, and/or other properties.

Figure 11:
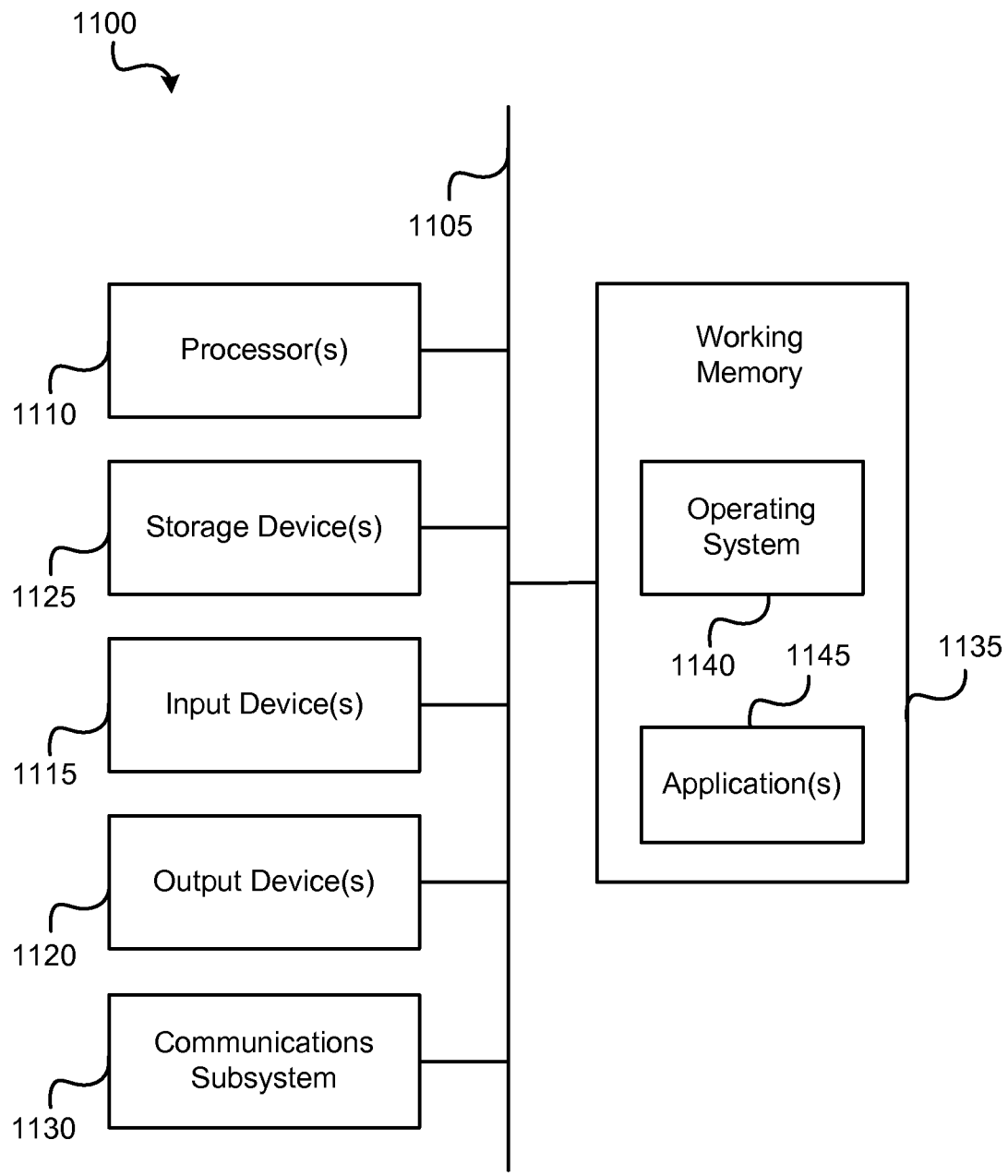
FIG. 11 is a block diagram of an example of a computer system.

A computer system 1100 as illustrated in FIG. 11 may be utilized to at least partially implement the functionality of the previously described computerized devices. FIG. 11 provides a schematic illustration of one embodiment of a computer system 1100 that can perform the methods provided by various other embodiments, as described herein, and/or can function as a mobile device or other computer system. FIG. 11 provides a generalized illustration of various components, any or all of which may be utilized as appropriate. FIG. 11, therefore, broadly illustrates how individual system elements may be implemented in a relatively separated or relatively more integrated manner.

The computer system 1100 is shown comprising hardware elements that can be electrically coupled via a bus 1105 (or may otherwise be in communication, as appropriate). The hardware elements may include one or more processors 1110, including without limitation one or more general-purpose processors and/or one or more special-purpose processors (such as digital signal processing chips, graphics acceleration processors, and/or the like); one or more input devices 1115, which can include without limitation a mouse, a keyboard and/or the like; and one or more output devices 1120, which can include without limitation a display device, a printer and/or the like. The processor(s) 1110 can include, for example, intelligent hardware devices, e.g., a central processing unit (CPU) such as those made by Intel® Corporation or AMD®, a microcontroller, an ASIC, etc. Other processor types could also be utilized.

The computer system 1100 may further include (and/or be in communication with) one or more non-transitory storage devices 1125, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1100 might also include a communications subsystem 1130, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1130 may permit data to be exchanged with a network (such as the network described below, to name one example), other computer systems, and/or any other devices described herein. In many embodiments, the computer system 1100 will further comprise, as here, a working memory 1135, which can include a RAM or ROM device, as described above.

The computer system 1100 also can comprise software elements, shown as being currently located within the working memory 1135, including an operating system 1140, device drivers, executable libraries, and/or other code, such as one or more application programs 1145, which may comprise computer programs provided by various embodiments, and/or may be designed to implement methods, and/or configure systems, provided by other embodiments, as described herein. Merely by way of example, one or more processes described herein might be implemented as code and/or instructions executable by a computer (and/or a processor within a computer). Such code and/or instructions can be used to configure and/or adapt a general purpose computer (or other device) to perform one or more operations in accordance with the described methods.

A set of these instructions and/or code might be stored on a computer-readable storage medium, such as the storage device(s) 1125 described above. In some cases, the storage medium might be incorporated within a computer system, such as the system 1100. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1100 and/or might take the form of source and/or installable code, which, upon compilation and/or installation on the computer system 1100 (e.g., using any of a variety of generally available compilers, installation programs, compression/decompression utilities, etc.) then takes the form of executable code.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

A computer system (such as the computer system 1100) may be used to perform methods in accordance with the disclosure. Some or all of the procedures of such methods may be performed by the computer system 1100 in response to processor 1110 executing one or more sequences of one or more instructions (which might be incorporated into the operating system 1140 and/or other code, such as an application program 1145) contained in the working memory 1135. Such instructions may be read into the working memory 1135 from another computer-readable medium, such as one or more of the storage device(s) 1125. Merely by way of example, execution of the sequences of instructions contained in the working memory 1135 might cause the processor(s) 1110 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1100, various computer-readable media might be involved in providing instructions/code to processor(s) 1110 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1125. Volatile media include, without limitation, dynamic memory, such as the working memory 1135. Transmission media include, without limitation, coaxial cables, copper wire and fiber optics, including the wires that comprise the bus 1105, as well as the various components of the communication subsystem 1130 (and/or the media by which the communications subsystem 1130 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, a Blu-Ray disc, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1100. These signals, which might be in the form of electromagnetic signals, acoustic signals, optical signals and/or the like, are all examples of carrier waves on which instructions can be encoded, in accordance with various embodiments of the invention.

The communications subsystem 1130 (and/or components thereof) generally will receive the signals, and the bus 1105 then might carry the signals (and/or the data, instructions, etc. carried by the signals) to the working memory 1135, from which the processor(s) 1105 retrieves and executes the instructions. The instructions received by the working memory 1135 may optionally be stored on a storage device 1125 either before or after execution by the processor(s) 1110.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

As used herein, including in the claims, unless otherwise stated, a statement that a function or operation is "based on" an item or condition means that the function or operation is based on the stated item or condition and may be based on one or more items and/or conditions in addition to the stated item or condition.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method, performed by an apparatus, for determining proximity of a mobile device to a target location, the method comprising: identifying a signal sent by the mobile device and received by respective ones of a set of receivers including at least a first receiver and a second receiver, wherein the first receiver and the second receiver are positioned collinearly to the target location; determining a first signal-quality metric observed at the first receiver and a second signal-quality metric observed at the second receiver with respect to the signal;

computing a ratio associated with distances from the mobile device to the first receiver and the second receiver, respectively, based on the first signal-quality metric and the second signal-quality metric; and determining whether the mobile device is within a proximity region defined in relation to the target location based on a comparison of the ratio with a ratio constant which is a ratio of a first distance between each point of a set of points of the proximity region surrounding the target location and the first receiver, and a second distance between the each point of the set of points and the second receiver.

2. The method of claim 1 wherein the first signal-quality metric and the second signal-quality metric each respectively comprises at least one of packet loss rate or received signal strength indications (RSSI).

3. The method of claim 2 wherein computing the ratio comprises computing the ratio as a difference of the first signal-quality metric and the second signal-quality metric.

4. The method of claim 1 wherein the proximity region is a circular region centered on the target location.

5. The method of claim 4 wherein the proximity region comprises a set of points, wherein for each point of the set of points, a ratio of a first distance between the point and the first receiver and a second distance between the point and the second receiver is equal to a ratio constant.

6. The method of claim 5 wherein the determining comprises determining that the mobile device is within the proximity region if the computed ratio is less than or equal to the ratio constant.

7. The method of claim 5 further comprising:
defining the target location and a radius of the proximity region; and
positioning the first receiver and the second receiver such that the set of points forms the proximity region.

8. The method of claim 4 further comprising:
defining positions of the first receiver and the second receiver and at least one of the ratio constant or a radius of the proximity region; and
determining a position of the target location based on the positions of the first receiver and the second receiver and the ratio constant or the radius of the proximity region.

9. The method of claim 1 further comprising:
defining the target location and a size of the proximity region; and
positioning the first receiver and the second receiver in relation to the target location based on the size of the proximity region.

10. The method of claim 1 further comprising:
defining positions of the first receiver and the second receiver and a size of the proximity region; and
determining a position of the target location based on the positions of the first receiver and the second receiver and the size of the proximity region.

11. The method of claim 1 further comprising:
identifying a source of secured data stored on a network; and
conditioning access to the secured data by the mobile device on the mobile device being identified within the proximity region.

12. The method of claim 1 further comprising communicatively coupling the mobile device to at least a second communication device upon determining that the mobile device is within the proximity region.

13. The method of claim 1 further comprising communicating an alert if the mobile device is determined to be outside the proximity region.

14. The method of claim 1 wherein computing the ratio comprises:
estimating a first distance from the mobile device to the first receiver based on the first signal-quality metric;
estimating a second distance from the mobile device to the second receiver based on the second signal-quality metric; and
computing the ratio as a distance ratio of the first distance and the second distance.

15. An apparatus for determining proximity of a mobile device to a target location, the apparatus comprising: a set of receivers including at least a first receiver and a second receiver, wherein the first receiver and the second receiver are positioned collinearly to the target location and a proximity region defined in relation to the target location, and wherein each of the set of receivers are configured to receive a signal from the mobile device; a signal analysis module communicatively coupled to the set of receivers and configured to determine a first signal-quality metric observed at the first receiver and a second signal-quality metric observed at the second receiver with respect to the signal; and a proximity detection module communicatively coupled to the signal analysis module and configured to compute a ratio associated with distances from the mobile device to the first receiver and the second receiver, respectively, based on the first signal-quality metric and the second signal-quality metric and to determine whether the mobile device is within the proximity region based on a comparison of the ratio with a ratio constant which is a ratio of a first distance between each point of a set of points of the proximity region surrounding the target location and the first receiver, and a second distance between the each point of the set of points and the second receiver.

16. The apparatus of claim 15 wherein:
the first signal-quality metric and the second signal-quality metric each respectively comprises a received signal strength indication (RSSI); and
the proximity detection module is further configured to compute the ratio as a difference of the first signal-quality metric and the second signal-quality metric.

17. The apparatus of claim 15 wherein the proximity region is a circular region centered on the target location and comprises a set of points such that, for each point of the set of points, a ratio of a first distance between the point and the first receiver and a second distance between the point and the second receiver is equal to a ratio constant.

18. The apparatus of claim 17 wherein the proximity detection module is configured to determine whether the mobile device is within the proximity region by comparing the ratio of the first signal-quality metric and the second signal-quality metric to the ratio constant.

19. The apparatus of claim 18 further comprising:
a proximity region definition module configured to define the target location and a radius of the proximity region; and
a receiver positioning module communicatively coupled to the proximity region definition module and configured to position the first receiver and the second receiver such that the set of points forms the proximity region.

20. The apparatus of claim 18 further comprising:
a receiver positioning module configured to define positions of the first receiver and the second receiver; and
a proximity region definition module communicatively coupled to the receiver positioning module and configured to define at least one of the ratio constant or a radius of the proximity region and to determine a position of the target location based on the positions of the first receiver and the second receiver and the ratio constant or the radius of the proximity region.

21. The apparatus of claim 15 further comprising:
a proximity region definition module configured to define the target location and a size of the proximity region; and
a receiver positioning module communicatively coupled to the proximity region definition module and configured to position the first receiver and the second receiver in relation to the target location based on the size of the proximity region.

22. The apparatus of claim 15 further comprising:
a receiver positioning module configured to define positions of the first receiver and the second receiver; and
a proximity region definition module communicatively coupled to the receiver positioning module and configured to define a size of the proximity region and to determine a position of the target location based on the positions of the first receiver and the second receiver and the size of the proximity region.

23. The apparatus of claim 15 wherein the first receiver and the second receiver comprise receive antennas coupled to a multi-antenna communication device.

24. The apparatus of claim 15 further comprising:
a secured network location associated with at least one of data or network devices; and
a security management module communicatively coupled to the secured network location and the proximity detection module and configured to condition access to the secured network location by the mobile device on the mobile device being identified within the proximity region by the proximity detection module.

25. The apparatus of claim 15 further comprising an alarm module communicatively coupled to the proximity detection module and configured to communicate an alert if the mobile device is determined to be outside the proximity region by the proximity detection module.

26. An apparatus for determining proximity of a mobile device to a target location, the apparatus comprising: means for identifying a signal sent by the mobile device and received by respective ones of a set of receivers including at least a first receiver and a second receiver, wherein the first receiver and the second receiver are positioned collinearly to the target location; means for determining a first signal-quality metric observed at the first receiver and a second signal-quality metric observed at the second receiver with respect to the signal; means for computing a ratio associated with distances from the mobile device to the first receiver and the second receiver, respectively, based on the first signal-quality metric and the second signal-quality metric; and means for determining whether the mobile device is within a proximity region defined with respect to the target location based on a comparison of the ratio with a ratio constant which is a ratio of a first distance between each point of a set of points of the proximity region surrounding the target location and the first receiver, and a second distance between the each point of the set of points and the second receiver.

27. The apparatus of claim 26 wherein:
the first signal-quality metric and the second signal-quality metric each respectively comprises a received signal strength indication (RSSI); and
the means for computing the ratio comprises means for computing the ratio as a difference of the first signal-quality metric and the second signal-quality metric.

28. The apparatus of claim 26 wherein the proximity region is a circular region centered on the target location and comprises a set of points such that, for each point of the set of points, a ratio of a first distance between the point and the first receiver and a second distance between the point and the second receiver is equal to a ratio constant.

29. The apparatus of claim 28 wherein the means for determining whether the mobile device is within the proximity region comprises means for determining that the mobile device is within the proximity region if the computed ratio is less than or equal to the ratio constant.

30. The apparatus of claim 26 further comprising:
means for defining the target location and a size of the proximity region; and
means for positioning the first receiver and the second receiver in relation to the target location based on the size of the proximity region.

31. The apparatus of claim 26 further comprising:
means for defining positions of the first receiver and the second receiver and a size of the proximity region; and
means for determining a position of the target location based on the positions of the first receiver and the second receiver and the size of the proximity region.

32. The apparatus of claim 26 wherein the first receiver and the second receiver comprise receive antennas coupled to a multi-antenna communication device.

33. The apparatus of claim 26 further comprising:
means for identifying a source of secured data stored on a network; and
means for conditioning access to the secured data by the mobile device on the mobile device being identified within the proximity region.

34. The apparatus of claim 26 further comprising means for communicatively coupling the mobile device to at least a second communication device upon determining that the mobile device is within the proximity region.

35. The apparatus of claim 26 further comprising means for communicating an alert if the mobile device is determined to be outside the proximity region.

36. A computer program product residing on a non-transitory processor-executable computer storage medium, the computer program product comprising processor-executable instructions configured to cause a processor to: identify a signal sent by a mobile device and received by respective ones of a set of receivers including at least a first receiver and a second receiver, wherein the first receiver and the second receiver are positioned collinearly to a target location; determine a first signal-quality metric observed at the first receiver and a second signal-quality metric observed at the second receiver with respect to the signal; compute a ratio associated with distances from the mobile device to the first receiver and the second receiver, respectively, based on the first signal-quality metric and the second signal-quality metric; and determine whether the mobile device is within a proximity region defined with respect to the target location based on a comparison of the ratio with a ratio constant which is a ratio of a first distance between each point of a set of points of the proximity region surrounding the target location and the first receiver, and a second distance between the each point of the set of points and the second receiver.

37. The computer program product of claim 36 wherein the proximity region is a circular region centered on the target location and comprises a set of points such that, for each point of the set of points, a ratio of a first distance between the point and the first receiver and a second distance between the point and the second receiver is equal to a ratio constant.

38. The computer program product of claim 37 further comprising instructions configured to cause the processor to determine that the mobile device is within the proximity region if the computed ratio is less than or equal to the ratio constant.

39. The computer program product of claim 36 further comprising instructions configured to cause the processor to:
define the target location and a size of the proximity region; and
position the first receiver and the second receiver in relation to the target location based on the size of the proximity region.

40. The computer program product of claim 36 further comprising instructions configured to cause the processor to:
define positions of the first receiver and the second receiver and a size of the proximity region; and
determine a position of the target location based on the positions of the first receiver and the second receiver and the size of the proximity region.

* * * * *